US005859873A

United States Patent [19]
Ritter

[11] Patent Number: 5,859,873

[45] Date of Patent: Jan. 12, 1999

[54] METHOD AND ARRANGEMENT FOR NON-CONTACT TRANSMISSION OF MEASURED VALUES

[75] Inventor: Siegfried Ritter, Arnstadt, Germany

[73] Assignee: U.S. Philips Corporation, N.Y.

[21] Appl. No.: 768,473

[22] Filed: Dec. 18, 1996

[30] Foreign Application Priority Data

Dec. 20, 1995 [DE] Germany ........................ 195 47 684.0

[51] Int. Cl.[6] ........................................ H04B 5/02

[52] U.S. Cl. .......................... 375/259; 315/352; 315/377; 455/41; 455/70; 455/107; 455/352; 455/343; 340/870.16; 340/825.15; 340/825.54; 340/333

[58] Field of Search ......................... 340/825.54, 825.31, 340/310.01, 825.34, 825.3, 572, 855.8, 870.16–870.17, 505, 531, 825.06, 825.15, 333; 342/51; 235/375; 455/41, 70, 107, 522, 352, 343; 375/259, 295, 315–316, 352, 377

[56] References Cited

U.S. PATENT DOCUMENTS

| | | | |
|---|---|---|---|
| 4,837,556 | 6/1989 | Matsushita et al. | 340/310.01 |
| 4,864,292 | 9/1989 | Nieuwkoop | 340/825.31 |
| 5,019,813 | 5/1991 | Kip et al. | 340/825.54 |

FOREIGN PATENT DOCUMENTS

| | | | |
|---|---|---|---|
| 0457306A2 | 11/1991 | European Pat. Off. | G08C 23/00 |
| 0601739A2 | 6/1994 | European Pat. Off. . | |
| 4323530A1 | 1/1995 | Germany | H04B 7/00 |
| 2138609 | 10/1984 | United Kingdom | G01F 15/06 |
| WO9411851 | 5/1994 | WIPO | G08C 23/00 |
| WO9527272 | 10/1995 | WIPO . | |

*Primary Examiner*—Amanda T. Le
*Attorney, Agent, or Firm*—Anne E. Barschall

[57] ABSTRACT

A measuring unit which is not easily accessible often has a power source which supplies power to the elements for the measuring operation, more particularly, the conversion of an analog measured signal into digital measured data, and for storage thereof, as required. These measured data of a measuring unit are transmitted to a base station without any contact being made the moment this base station is brought into the neighborhood of the measuring unit and transmits a signal. For a minimum load on the power source power from the power source is not supplied to the transmitter for the transmission of measured data from the measuring unit to the base station. Instead, a signal transmitted by the base station provides transmission power. In the measuring unit this signal provides a voltage for feeding the transmitter. Furthermore, via tuned circuits, during an inductive coupling between base station and measuring unit, an impedance is connected to the tuned circuit of the measuring unit via a switch which is controlled by the transmitted measured data. This change of impedance can then be evaluated in the base station by evaluating the current in the tuned circuit. The signal transmitted by the base station can also be used to recharge the power source in the measuring unit.

18 Claims, 1 Drawing Sheet

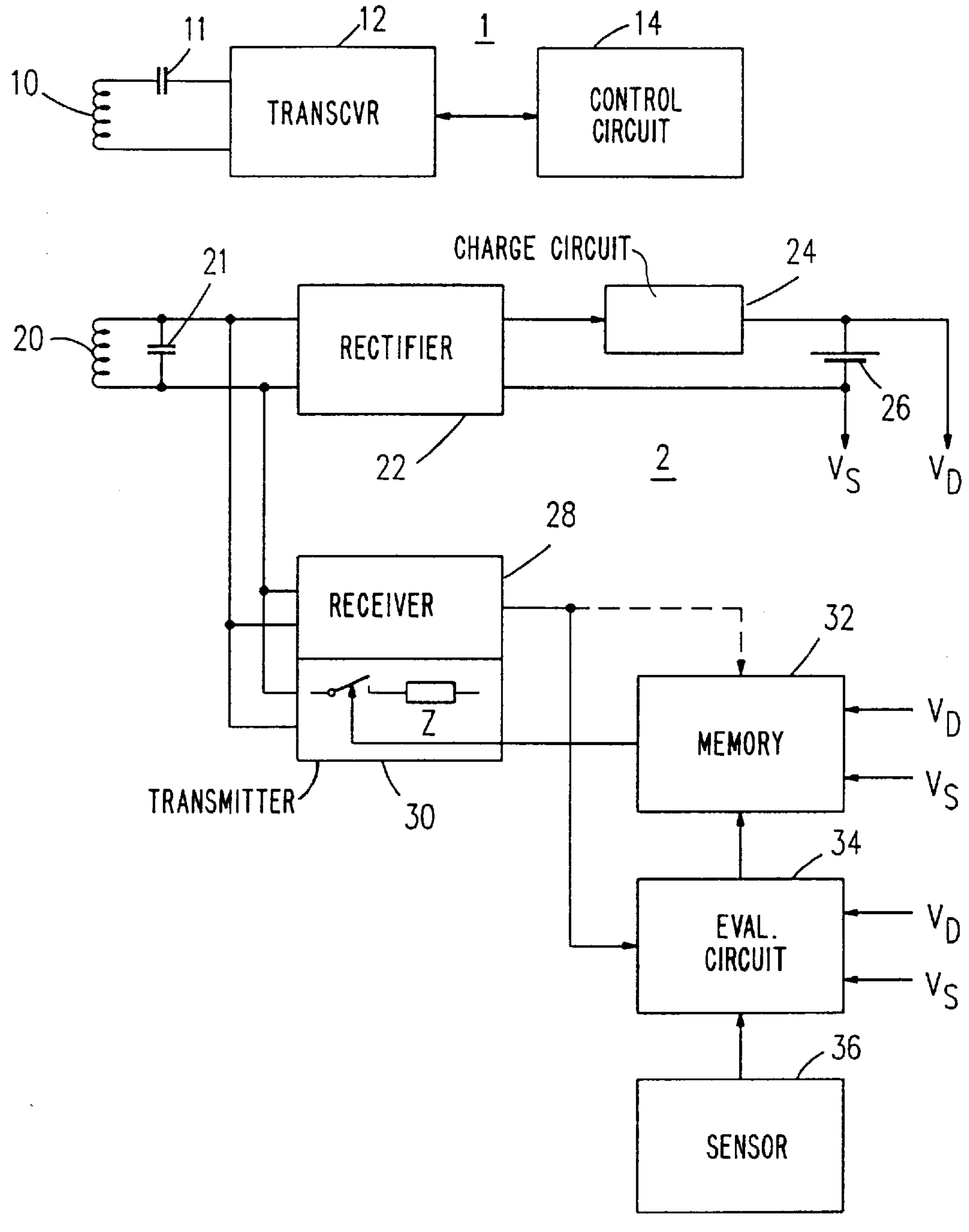
10
11
12
1
14
TRANSCVR
CONTROL CIRCUIT
CHARGE CIRCUIT
21
24
20
RECTIFIER
26
22
2
$V_S$
$V_D$
28
RECEIVER
32
Z
MEMORY
$V_D$
$V_S$
TRANSMITTER
30
34
EVAL. CIRCUIT
$V_D$
$V_S$
36
SENSOR

METHOD AND ARRANGEMENT FOR NON-CONTACT TRANSMISSION OF MEASURED VALUES

BACKGROUND OF THE INVENTION

This invention relates to a method of non-contact transmission of measured values and a respective arrangement for non-contact transmission of measured values.

Methods or arrangements for non-contact transmission are preferably used for measured values from measuring units which are not easily accessible and whose measured values are not required continuously. Examples of this category are many measurements of consumption data and temperature measurements such as the measurement of a room temperature for controlling a heating system. Also in the medical field, when physiological measured values of an implanted measuring unit are necessary, over a rather long period of time, such methods or arrangements can be used to advantage.

From WO 95/27272 is known a method and apparatus by which measured values of a remote measuring unit can be read by a reading device. At the measuring unit there are a sensor and an electronic interface unit, which interface unit is powered by a local power source and converts the measured values of the sensor into preferably digital measured data. Furthermore, both the measuring unit and the reading device have a transceiver arrangement. In order to have the least possible power consumption of the power source, the interface unit is rendered inactive during rather long periods of time and switched to the receiving mode only periodically. When data are to be transmitted, the reading device transmits a data request signal, recurrently if need be, until a request signal occurs during the period of time in which the interface unit is in the active state. This interface unit then causes a measured value or a sequence of measured values to be transmitted. This data transmission requires relatively much power from the power source even though this is for a brief period of time, so that the power source is heavily loaded and has a short useful life when measured data are transmitted frequently.

From EP 0 601 739 A2 is known a data transmission method of a measuring unit by means of an interrogation circuit, in which the circuit of the measuring unit and the interrogation circuit are coupled to each other via antennas. The power for operating the sensor and converting the measured values and transmitting them is provided via these antennas. The measuring unit thus does not need a power source of its own. However, a measurement can only be effected if the interface unit is in the active state. In addition, an interface unit is capable of reaching no more than one measuring unit in this manner. On the other hand, with this known method it is not possible that data can no longer be measured or transmitted due to the premature running down of the power source, because the interrogation circuit is easily accessible or stationary, and can therefore have sufficiently large power reserves.

SUMMARY OF THE INVENTION

It is an object of the invention to provide a method and an arrangement by which the measured data of preferably a plurality of measuring units can be picked up, these measuring units comprising power sources whose useful life is maximized while having small dimensions.

For achieving this object, the power source of the or each measuring unit respectively, is used only for recording and converting the measured values, whereas the power transmitted by the base station is used for transmission, i.e. for transmitting the measured data from the measuring unit to the base station. In consequence, the power source of the measuring unit is not loaded for transmitting the data and has thus a longer useful life. The base station, more particularly when this base station is used for transmitting measured values of a plurality of measuring units, may have a transmission power so that even with a certain distance from the measuring unit, this measuring unit still receives enough power to transmit the measured values.

An even longer useful life of the power source is made possible if the power received in the measuring unit from the base station is used for feeding power to the power source for charging or recharging purposes. With an appropriate duration of the transmission from the base station, it is then possible to recharge in the power source all the power consumed between two transmission operations in the measuring unit, so that the measuring unit can be operated substantially unrestrictedly long even with very small power sources, in so far as these power sources store sufficient power which is necessary for the functions performed in the measuring unit between two transmission operations.

This is particularly important when the instants at which measured data are transmitted are relatively wide apart and in the meantime measured values of the sensor are frequently converted into measured data and buffered in a memory of the evaluation circuit. Data acquisition in between the transmission operations is to be powered by the power source of the measuring unit. The stored measured data are then transmitted from the memory via the transceiver of the measuring unit to the base station.

The power for transmitting the measured data, which power the measuring unit receives from the base station, may be used in that a DC voltage is generated from this power received, for example, via a coil or a capacitor, which DC voltage is used for feeding the transmitter of the measuring unit. This transmitter then transmits preferably at a different frequency from that of the base station. If the base station and the measuring unit are inductively coupled each via an antenna arranged as a coil, another possibility is that a controllable impedance is connected to the coil of the measuring unit, which impedance is controlled by the measured data and that the change of the impedance is evaluated in the base station. This principle is basically known from data exchange systems having a portable data carrier and a fixed station, for example, from DE 43 23 530 A1, in which also the recharging of a power store with the power transmitted from a fixed station is described.

BRIEF DESCRIPTION OF THE DRAWINGS

The invention will be further explained with reference to an illustrative embodiment shown in the drawing FIGURE.

DESCRIPTION OF THE PREFERRED EMBODIMENTS

The elements of a base station 1 and a measuring unit 2 which are most important to the invention are shown in this FIGURE. The base station 1 comprises a control circuit 14 which is generally formed by a processor, more particularly, a microprocessor with further elements. This control circuit 14 controls a transceiver 12 which comprises, for example, an oscillator and a demodulator. The latter elements are connected to a series resonance circuit formed by a series combination of a capacitor 11 and a coil 10 wherein this coil represents an antenna.

When measured values are transmitted, this coil 10 is inductively coupled to a coil 20 of the measuring unit 2, which coil 20 represents the antenna of this measuring unit. The coil 20 and the capacitor 21 together form a parallel resonance circuit which is connected, for example, to a rectifier 22 which generates a DC voltage from the voltage induced in the coil 20. When this DC voltage has a sufficiently large value, a charging voltage for a power store 26, represented here as an accumulator, is generated in a charging circuit 24 and the accumulator 26 is charged thereby. The two poles of the accumulator 26 are referenced $V_S$ and $V_D$ and connected to the respectively shown supply voltage terminals of two elements 32 and 34, which elements will be explained hereafter.

The parallel resonance circuit formed by the coil 20 and the capacitor 21 is further connected to a transmitter 30 and a receiver 28 of the measuring unit 2. The receiver 28 demodulates a signal with which the transceiver 12 of the base station 1 has modulated the signal transmitted via the series resonance circuit formed by the coil 10 and the capacitor 11. This modulation particularly comprises an instruction for the measuring unit 2 to transmit measured data subsequent to this instruction.

This instruction is supplied to an evaluation circuit 34, which may also be arranged as a simple microprocessor and which is coupled to a sensor 36 which produces measured values. A measured value may be formed, for example, by an analog electric signal and this signal is converted into digital measured data in the evaluation circuit 34.

These measured data are applied to a non-volatile memory 32 and written therein. When an instruction from the base station 1 to transmit measured data is detected in the receiver 28, the evaluation circuit 34 drives the memory 32 and reads the stored measured values and transports them to the transmitter 30. The transmitter 30 comprises a series combination of a switch and an impedance Z. This impedance may in the simplest case be a resistor which loads the resonance circuit formed by the coil 20 and the capacitor 21 when the switch is closed. This additional load can be evaluated in the transceiver 12 of the base station 1, for example, in that with an additional load in the measuring unit 2, a rather high current flows in the series resonance circuit formed by the coil 10 and the capacitor 11 of the base station 1. The impedance Z, however, may also be arranged as a capacitor, so that the resonance frequency of the parallel resonance circuit formed by the coil 20 and the capacitor 21 as well as the then capacitive impedance Z will be tuned to a different value when the switch is closed. This too can be evaluated in the transceiver 12.

It is to be noted that the series resonance circuit formed by the coil 10 and the capacitor 11, and the parallel resonance circuit formed by the coil 20 and the capacitor 21, are at least tuned to the substantially same resonance frequency when the switch in the transmitter 30 is open.

The transmission of the measured values from the measuring unit 2 to the base station 1 is thus effected in that only a switch is closed or open. The control signal necessary for controlling the switch requires only very little power, especially if the switch is arranged as a field effect transistor. If also the evaluation circuit 34 and the non-volatile memory 32 are arranged in MOS technology, very little electric power from the accumulator 26 will be necessary for their operation. Hence it is possible that also during the time in which the measuring unit 2 is not coupled to the base station 1, or if the latter does not transmit any signal, measured values of the sensor 36 are repeatedly converted into measured data and consecutively stored in the memory 32. This may be effected at recurrent instants, for which purpose the evaluation circuit 34 then comprises a time-controlled measuring circuit, or if the measured signal produced by the sensor 36 meets certain conditions, for example, exceeds certain limit values or modification rates. For the quantity of the measured data stored in the memory 32 and for the overall useful life of the measuring unit 2 between two measured data transmissions to the base station, substantially the entire capacity of the accumulator 26 is available, because it can be recharged to its maximum capacity with each transmission, provided that the base station transmits a signal for a sufficiently long time.

The memory 32, to be more precise, a part thereof, may also be used for storing a program according to which the circuit 34 operates. This program, or parts of programs, may also be written in the memory 32 by the base station 1 via the receiver 28 of the measuring unit 2. Consequently, for example, during operation of the measuring unit, the evaluation program for the measured values of the sensor 36 may be altered.

The elements 22, 24 as well as 28 to 34 may advantageously be incorporated in a single integrated circuit to provide the smallest possible and most cost-effective structure. Via the interface to the sensor 36 or, even more favorably, on an interface to the memory 32, which is an external interface to the integrated circuit, it is then possible to connect external memories in addition to, or even instead of, the sensor 36, so that the integrated circuit is used as an enlarged memory of a data exchange circuit.

I claim:

1. A method for non-contact transmission of measured values of at least one active measuring unit comprising: deriving the measured values in the active measuring unit by means of a sensor and converting same into measured data in an evaluation circuit, using a local power source only for operating the evaluation circuit, transmitting the measured data to a base station when said base station is brought into spatial proximity to the measuring unit and transmits a signal to the measuring unit, and wherein the measured data are transmitted from the active measuring unit to the base station using only the power contained in the signal which is transmitted from the base station to the active measuring unit.

2. A method as claimed in claim 1, which further comprises, using the power of the signal transmitted by the base station and received in the active measuring unit for supplying additional power to the local power source.

3. A method as claimed in claim 2 further comprising, operating the evaluation circuit at specific instants to convert measured signals of the sensor into measured data and buffering said measured data in a memory of the evaluation circuit, and transmitting the measured data from the memory to the base station independently of their acquisition time.

4. A method as claimed in claim 1, further comprising, operating the evaluation circuit at specific instants to convert measured signals of the sensor into measured data and buffering said measured data in a memory of the evaluation circuit, and transmitting the measured data from the memory to the base station independently of their acquisition time.

5. A method as claimed in claim 4 wherein the base station and the active measuring unit are each inductably coupled by a respective inductor, and further comprising, transmitting the measured data by changing an impedance coupled to the inductor of the active measuring unit and evaluating the impedance change in the base station.

6. A method as claimed in claim 4 wherein the local power source is a rechargeable battery, and using said battery only for operation of the evaluation circuit and the memory, and periodically recharging said battery by means of the power in the signal transmitted from the base station to the active measuring unit.

7. A method as claimed in claim 1, in which the base station and the active measuring unit are each inductively coupled by a respective coil, and comprising, transmitting the measured data by changing an impedance coupled to the coil of the active measuring unit and evaluating the change of impedance in the base station.

8. An arrangement for non-contact transmission of measured values of at least one active measuring unit, comprising for each active measuring unit at least one sensor and one evaluation circuit for converting the measured values of the sensor into measured data, a power source and a transceiver for transmitting measured data and for receiving signals, at least one base station which comprises a control circuit and a transceiver for transmitting signals to the transceiver of the active measuring unit and for receiving measured data from the active measuring unit, the transceiver of the measuring unit and of the base station being coupled at times and the active measuring unit transmitting measured data only when the signal is received from the base station, characterized in that the power source of the active measuring unit is connected to a supply voltage terminal of only the evaluation circuit and in that the transmitter of the active measuring unit transmits the measured data to the base station by using only the power received from the base station.

9. An arrangement as claimed in claim 5 wherein a load circuit is connected to the transceiver of the active measuring unit, and the load circuit produces a voltage for charging the power source when power is received in said transceiver.

10. An arrangement as claimed in claim 8, wherein evaluation circuit comprises a measuring controller to change the evaluation circuit to a converting mode only during predefined first time periods and to a power-saving mode during the further time periods, and the evaluation circuit comprises a memory for storing measured data converted in the first time periods and an output of the memory is coupled to the transceiver of the active measuring unit.

11. An arrangement as claimed in claim 8 in which the transceiver of the active measuring unit and the base station each have a respective antenna arranged as a coil, which antennas can be inductively coupled to each other, wherein an impedance controllable by the evaluation circuit is connected to the coil of the active measuring unit.

12. A measuring unit for non-contact transmission of measured values of the measuring unit to a base station, comprising: a sensor for producing measured values, an active power source, an evaluation circuit for converting the measured values into measured data, a transceiver for transmitting measured data and for receiving signals, characterized in that the power source is coupled only to a supply voltage terminal of the evaluation circuit and in that the transceiver transmits measured data only on reception of a signal and by using only the power received from said signal.

13. A measuring unit as claimed in claim 12, further comprising a memory for buffering the measured data, means coupling the output of said memory to the transceiver, the evaluation circuit, the memory and the transceiver being incorporated in an integrated circuit.

14. A measuring unit as claimed in claim 13, wherein a data port of the memory is accessible from outside the integrated circuit, so that further memories can be connected.

15. A measuring unit as claimed in claim 12 wherein the power source comprises a rechargeable battery.

16. A measuring unit as claimed in claim 15 further comprising:

a parallel resonant LC circuit including an inductor (L) for transmitting measured data and for receiving signals, a battery charge circuit coupling the parallel resonant LC circuit to the battery to recharge the battery from the received signals, and means for coupling the parallel resonant LC circuit to the transceiver.

17. A measuring unit as claimed in claim 12 further comprising:

a memory for said measured data and coupled to the evaluation circuit, and wherein the power source is also coupled to a supply voltage terminal of the memory.

18. A measuring unit as claimed in claim 12 wherein the evaluation circuit comprises a controller for changing the evaluation circuit to a converting mode only during predefined first time periods and to a power saving mode during further time periods, and the evaluation circuit comprises a memory for storing measured data converted in the first time periods and an output of the memory is coupled to the transceiver.

* * * * *